United States Patent
Nagai

(12)
(10) Patent No.: US 6,236,626 B1
(45) Date of Patent: May 22, 2001

(54) AUTOMATIC LIBRARY SYSTEM INCLUDING HISTORY COLLECTING UNIT

(75) Inventor: Yoshinori Nagai, Kakogawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/108,831

(22) Filed: Jul. 2, 1998

(30) Foreign Application Priority Data

Feb. 6, 1998 (JP) ................................................. 10-025538

(51) Int. Cl.[7] .................................................... G11B 17/22
(52) U.S. Cl. ............................................................ 369/34
(58) Field of Search ................................. 369/34, 30, 33, 369/36, 37, 38, 39, 178; 711/111; 300/92

(56) References Cited

U.S. PATENT DOCUMENTS

| | | | |
|---|---|---|---|
| 5,155,850 | * 10/1992 | Janis et al. | 395/600 |
| 5,416,914 | * 5/1995 | Korngiebel et al. | 711/114 |
| 5,566,348 | * 10/1996 | Dahman et al. | 710/18 |
| 5,894,376 | * 4/1999 | Rinard | 360/77.08 |

FOREIGN PATENT DOCUMENTS

| | | | |
|---|---|---|---|
| 1-145744 | * 6/1989 | (JP) | 369/34 |
| 11-306004 | * 11/1999 | (JP) | 369/34 |

* cited by examiner

Primary Examiner—Tan Dinh
(74) Attorney, Agent, or Firm—Staas & Halsey LLP

(57) ABSTRACT

A library system is provided for systematically storing information recording media such as magnetic tape cartridges. The library system includes a loading-unloading unit for loading the recording media into the library system and for unloading the recording media out of the library system, a stocker for storing the recording media, a recording-playback unit for recording information on each of the recording media and for playing back each of the recording media, a transfer unit for transferring each of the recording media within the library system, and a controller for controlling the loading-unloading unit, the recording-playback unit and the transfer unit. Further, the library system also includes a history collecting unit for extracting history data from the loading-unloading unit, the recording-playback unit and the transfer unit, respectively.

22 Claims, 9 Drawing Sheets

FIG.7

| NAME | ADRS | NAME | ADRS |
|---|---|---|---|
| (NONE) | 00 | MTU #0 | 10 |
| R-ARD | 01 | MTU #1 | 11 |
| R-AMC | 02 | MTU #2 | 12 |
| R-CSV | 03 | MTU #3 | 13 |
| (NONE) | 04 | MTU #4 | 14 |
| CAS | 05 | MTU #5 | 15 |
| DEE #0 | 06 | MTU #6 | 16 |
| DEE #1 | 07 | MTU #7 | 17 |
| (NONE) | 08 | MTU #8 | 18 |
| L-ARD | 09 | MTU #9 | 19 |
| L-AMC | 0A | MTU #A | 1A |
| L-CSV | 0B | MTU #B | 1B |
| DM #0 | 0C | MTU #C | 1C |
| DM #1 | 0D | MTU #D | 1D |
| DM #2 | 0E | MTU #E | 1E |
| DM #3 | 0F | MTU #F | 1F |

AUTOMATIC LIBRARY SYSTEM INCLUDING HISTORY COLLECTING UNIT

BACKGROUND OF THE INVENTION

1. Field of the Invention

The present invention relates to a library system for storing a plurality of information recording media such as magnetic tape cartridges and for recording information on any selected one of the recording media or playing back any selected one of the recording media.

2. Description of the Related Art

Conventionally, a large amount of information used for processing with a computer was stored with the use of magnetic tapes. Recently, due to the wide spread use of computers, the amount of information to be processed by computers has drastically increased, so that the number of magnetic tape cartridges used for storage of the increased information has also increased drastically. Under this situation, there has been an increasing need for a fully automated tape library system.

For better understanding, a typical prior art library system is now described with reference to FIGS. 8 and 9 of the accompanying drawings. FIG. 8 schematically illustrates the physical or mechanical arrangement of the library system 51, whereas FIG. 9 is a circuit block diagram representing a control wiring arrangement used for controlling the library system.

As shown in FIG. 8, the library system 51 comprises two shelf-type stockers 66 (only one shown in FIG. 8) each having a plurality of divided compartments for exchangeably accommodating magnetic tape cartridges 64. Each of the stockers 66 is disposed on a respective side of a common transfer track 65 used for movement of two accessors (ACC) 55R, 55L each of which is a carrier robot. The transfer track 65 may include a pair of rails. Each of the ACCs 55R, 55L makes access to each of the stocker compartments for transferring a selected tape cartridge from one position to another within the library system 51 while running on the track 66. The two accessors 55R, 55L, instead of one, are provided for increasing the processing speed while availing one of the accessors for continuation of the process even if the other accessor fails.

In addition to the stockers 66, the ACCs 55R, 55L and the transfer track 65, the library system 51 further comprises two accessor directors (ADR) 52R, 52L (see FIG. 9), two accessor mechanism controllers (AMC) 53R, 53L, two control servos (CSV) 54R, 54L, a cartridge access station (CAS) 56, a direct entry-exit (DEE) 57, and a tapedrive mount unit (TMU) 58. The TMU 58 includes a plurality of drive monitors (DM) 59 and a plurality of magnetic tapedrive units (MTU) 60. The ADRs 52L, 52R are connected to a host computer 62. Though not shown, each of the ADRs 52R, 52L, the AMCs 53R, 53L, the CSVs 54R, 54L, the CAS 56, the DEE 57, the DMs 59 and the MTUs 60 has a MPU of its own.

The ADRs 52R, 52L control the AMCs 53R, 53L and the DM 59 under the instructions of the host computer 62. The AMCs 53R, 53L control the CSVs 54R, 54L, the CAS 56 and the DEE 57 under the instructions of the ADRs 52R, 52L. The CSVs 54R, 54L control the drive motors (not shown) of the respective ACCs 55R, 55L under the instructions of the AMCs 53R, 53L. Thus, the ADRs 52R, 52L, the AMCs 53R, 53L, the CSVs 4R, 4L and the ACCs 55R, 55L are connected in hierarchy for controlling purposes.

As shown in FIG. 1, each of the CAS 56, the DEE 57 and the TMU 58 may be respectively installed in a suitable stocker portion not used for cartridge storage. The CAS 56 (cartridge access station) is a unit which is used by the outside operator (not shown) for loading an individual tape cartridge into the library system 51 and for unloading an individual tape cartridge from the library system, whereas the DEE 57 (direct entry-exit) is a unit which is used by the outside operator for loading and unloading a batch of tape cartridges (e.g. ten cartridges) housed in a case.

The TMU 58 (tapedrive mount unit) is a unit for mounting the plurality of DMs 59 (drive monitors) and the plurality of MTUs 60 (magnetic tapedrive units). The DMs 59 monitor the operational states of the MTUs 60, whereas each of the MTUs 60 drives a tape cartridge for recording and playback.

Normally, the right ADR 52R controls the TMU 9 and both of the AMCs 53R, 53L (used also for controlling the CAS 56 and the DEE 57). However, when the right ADR 52R fails, the left ADR 52L takes the place of the right ADR 52R for controlling the TMU 58 and both of the AMCs 53R, 53L.

Though not shown in FIGS. 8 and 9, each of the ADRs 52R, 52L, the AMCs 53R, 53L, the CSVs 54R, 54L, the CAS 56, the DEE 57 and the DMs 59 incorporates a micro processing unit (MPU) and a RS-232C connector of its own. The RS-232 connector is provided for realizing the function of a field maintenance device (FMC). More specifically, when one or more of the ADRs 52R, 52L, the AMCs 53R, 53L, the CSVs 54R, 54L, the CAS 56, the DEE 57 and the DMs 59 fail, a personal computer is connected to the RS-232C connector of each failed element for extracting the operation history data from the relevant MPU. The extracted history data are used for analyzing the cause for the failure and for debugging the MPU.

With the above-described prior art library system 51, however, an operator must go to the location of the library system for connecting a personal computer to the connector of each of the failed elements and repeat a similar operation as many times as the number of the failed elements. Thus, the history extraction is relatively laborious and time-taking.

Further, since each of the ADRs 52R, 52L, the AMCs 53R, 53L, the CSVs 54R, 54L, the CAS 56, the DEE 57 and the DMs 59 does not have a special memory dedicated only for storing the history data, the history data of each MPU need to be stored in a RAM. Thus, unless the history extraction is performed immediately after the occurrence of a failure, the history data once stored in the RAM may be unexpectedly lost by overwriting before analysis if the RAM becomes full. Moreover, the history data stored in the RAM may be also lost at the time of a power failure.

SUMMARY OF THE INVENTION

It is therefore an object of the present invention to provide a library system which is capable of conveniently and quickly extracting history data from various elements of the library system as required for removal of a cause for an operation error or failure.

According to a first aspect of the present invention, there is provided a library system for information recording media comprising: a loading-unloading unit for loading the recording media into the library system and for unloading the recording media out of the library system; a stocker for storing the recording media; a recording-playback unit for recording information on each of the recording media and for playing back each of the recording media; a transfer unit for transferring each of the recording media within the library system; a controller for controlling the loading-unloading unit, the recording-playback unit and the transfer unit; a group of control lines for connecting the controller to the loading-unloading unit, the recording-playback unit and the transfer unit; a group of maintenance lines provided separately from the group of control lines for extracting history data from the loading-unloading unit, the recording-playback unit and the transfer unit, respectively; and a maintenance interface network connected to the group of maintenance lines for output of the extracted history data.

Various advantages obtainable by the above-described library system will be specifically described hereinafter in connection with the preferred embodiment given with reference to the accompanying drawings.

Each of the information recording media may be typically a magnetic tape cartridge. However, the recording medium may be a magneto-optical disc instead.

The stocker may be a shelf-type stocker having a plurality of compartments divided by fixed shelves. Alternatively, the stocker may includes a plurality of rotary shelves.

Preferably, the loading-unloading unit and the recording-playback unit may be connected to the maintenance interface network in a daisy chain. In this case, each of the loading-unloading unit and the recording-playback unit is allocated a different address of its own for transmitting its history data to the maintenance interface network only upon input of its allocated address.

The library system may further comprise a plurality of intermediate control units connected in hierarchy to the controller for controlling the loading-unloading unit, the recording-playback unit and the transfer unit under the control of the controller, wherein each of the intermediate control units is also connected to the maintenance interface network and allocated a different address of its own. Thus, each of the intermediate control units transmits its history data to the maintenance interface network only upon input of its allocated address. For this purpose, the maintenance interface network may comprise an address recognition unit for recognizing an input address corresponding to each of the intermediate control units and for validating history extraction only from one of the intermediate control units corresponding to the input address.

In use, the maintenance interface network may be connected to a computer for entering a history extraction command to the maintenance interface network and for obtaining the extracted history data from the maintenance interface network. In this case, the computer may be connected to a communication line which is used for requesting history extraction by remote control. Alternatively or additionally, the computer may be programmed to enter a history extraction command to the maintenance interface network periodically at a predetermined time interval. Alternatively or additionally, the computer may be programmed to enter a history extraction command to the maintenance interface network upon reception of an error notice from the maintenance interface network.

Preferably, the maintenance interface network may comprise a non-volatile erasable memory for storing the extracted history data. Examples of such memory include a flash memory and an EEPROM (electrically erasable and programmable read-only memory).

According to a second aspect of the present invention, there is provided a library system for information recording media comprising: a loading-unloading unit for loading the recording media into the library system and for unloading the recording media out of the library system; a stocker for storing the recording media; a recording-playback unit for recording information on each of the recording media and for playing back each of the recording media; a transfer unit for transferring each of the recording media within the library system; a controller for controlling the loading-unloading unit, the recording-playback unit and the transfer unit; and a history collecting unit for extracting history data from the loading-unloading unit, the recording-playback unit and the transfer unit, respectively.

Preferably, the loading-unloading unit and the recording-playback unit may be connected to the maintenance interface network in a daisy chain. In this case, each of the loading-unloading unit and the recording-playback unit is allocated a different address of its own for transmitting its history data to the history collecting unit only upon input of its allocated address.

The library system may further comprise a plurality of intermediate control units connected in hierarchy to the controller for controlling the loading-unloading unit, the recording-playback unit and the transfer unit under the control of the controller, wherein each of the intermediate control units is also connected to the history collecting unit and allocated a different address of its own. Thus, each of the intermediate control units transmits its history data to the history collecting unit only upon input of its allocated address. For this purpose, the history collecting unit may comprise an address recognition unit for recognizing an input address corresponding to each of the intermediate control units and for validating history extraction only from one of the intermediate control units corresponding to the input address.

In use, the history collecting unit may be connected to a computer for entering a history extraction command to the history collecting unit and for obtaining the extracted history data from the history collecting unit. In this case, the computer nay be connected to a communication line which is used for requesting history extraction by remote control. Alternatively or additionally, the computer may be programmed to enter a history extraction command to the history collecting unit periodically at a predetermined time interval. Alternatively or additionally, the computer may be programmed to enter a history extraction command to the history collecting unit upon reception of an error notice from the history collecting unit.

Preferably, the history collecting unit may comprise a non-volatile erasable memory for storing the extracted history data.

In an embodiment of the present invention, the history collecting unit comprises a plurality of maintenance interface networks each of which is capable of extracting the history data from the loading-unloading unit, the recording-playback unit and the transfer unit, respectively. In use, a selected one of the maintenance interface networks is connected to a computer for entering a history extraction command to the selected maintenance interface network and for obtaining the extracted history data from the selected maintenance interface network.

Other features and advantages of the present invention should become clear from the detailed description to be made hereinafter referring to the accompanied drawings.

BRIEF DESCRIPTION OF THE DRAWINGS

In the accompanying drawings:

FIG. 7 is a table showing the addresses assigned to the various elements of the library system;

DETAILED DESCRIPTION OF THE PREFERRED EMBODIMENT

The preferred embodiment of the present invention will be specifically described below with reference to FIGS. 1 through 7 of the accompanying drawings.

Figure 1:
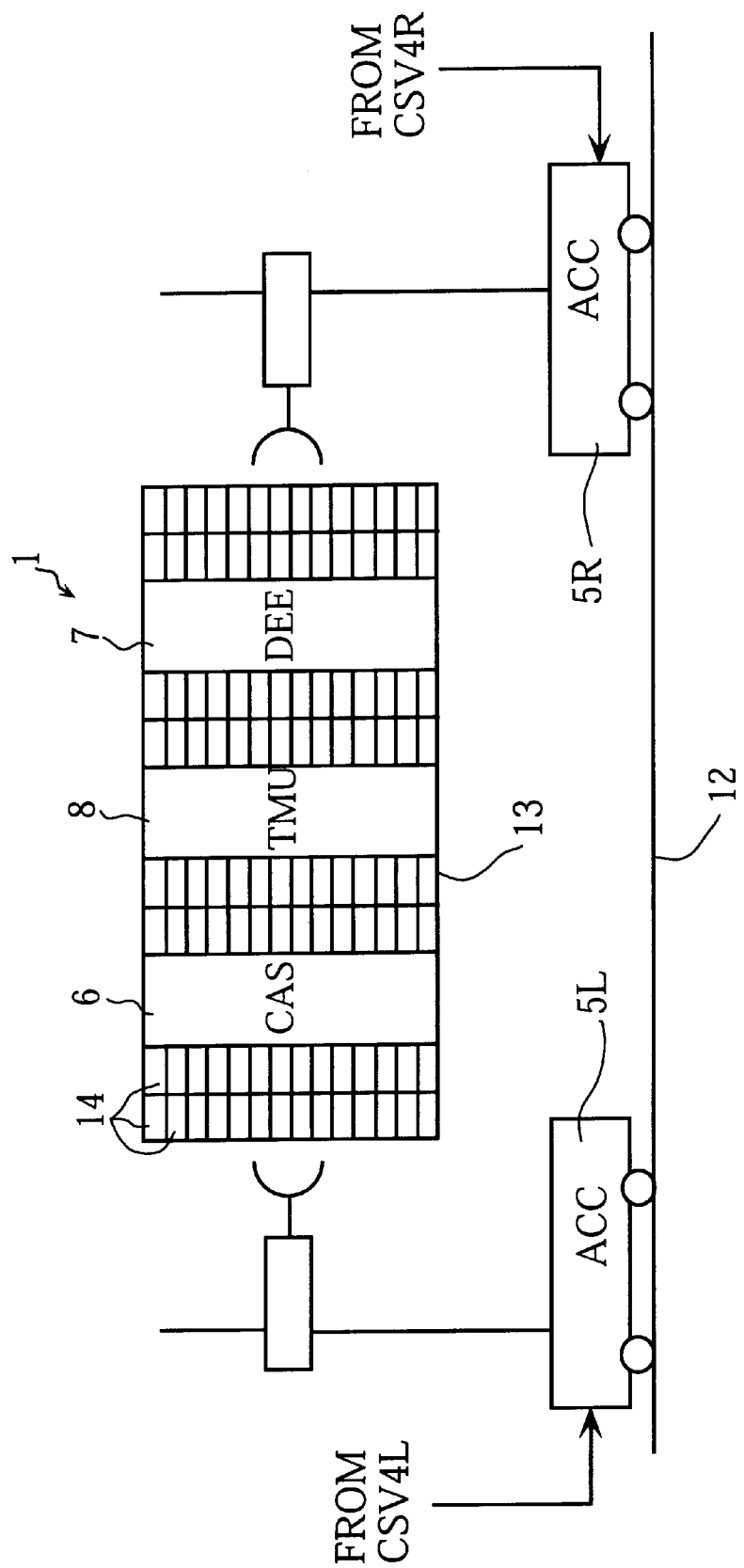
FIG. 1 is a schematic view showing the overall arrangement of a library system embodying the present invention.
Figure 2:
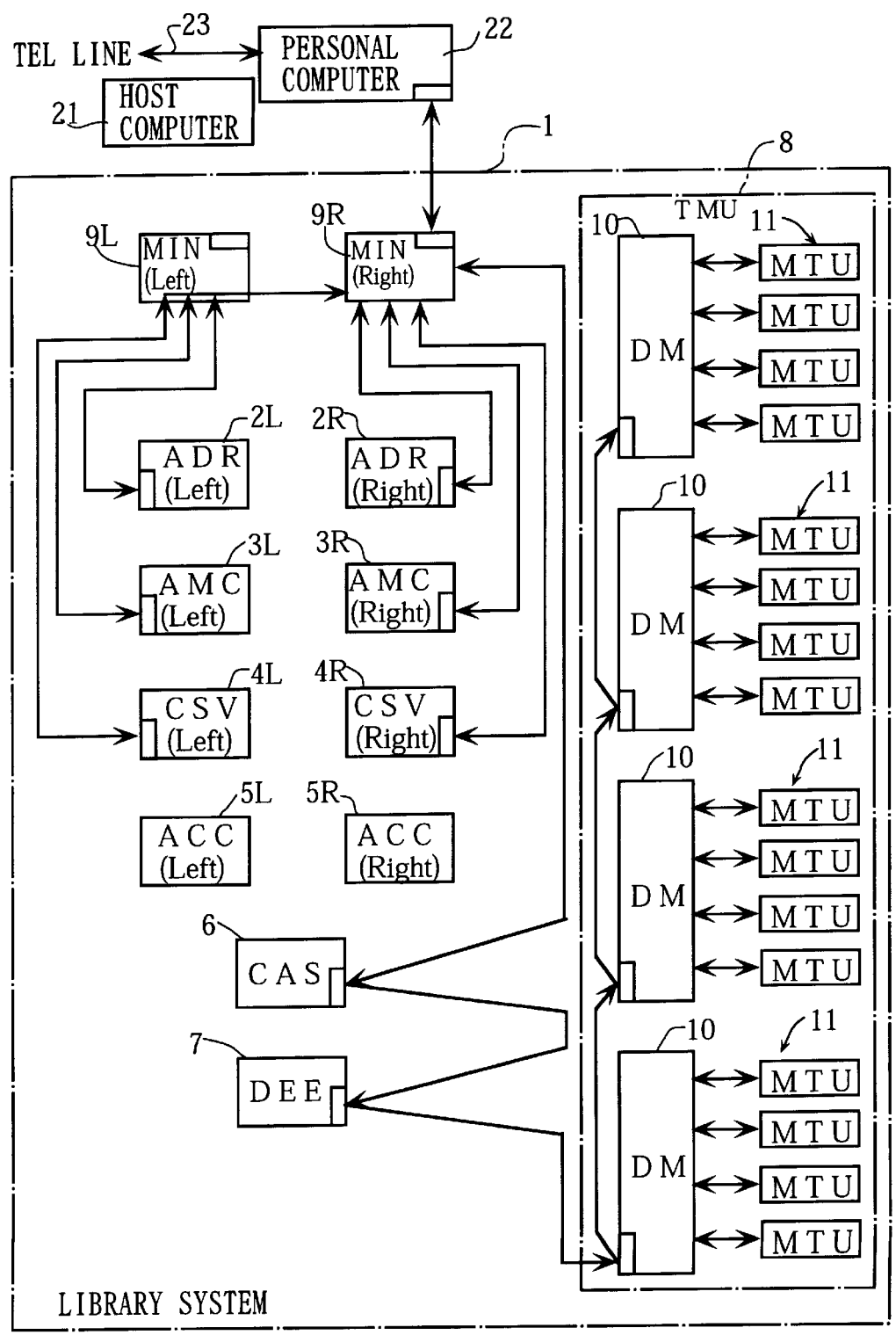
FIG. 2 is a circuit block diagram showing a maintenance wiring arrangement of the same library system.
Figure 3:
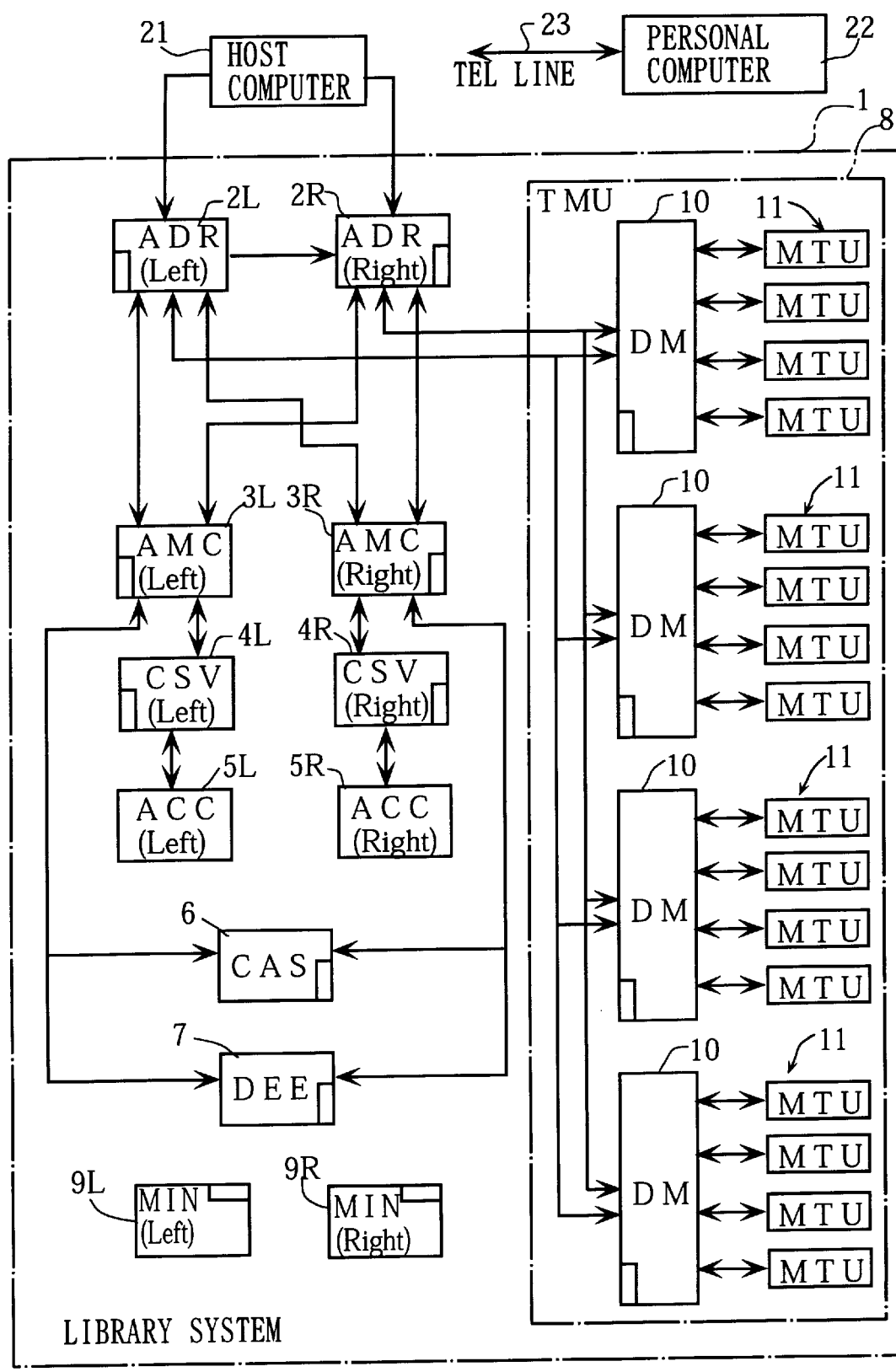
FIG. 3 is a circuit block diagram showing a control wiring arrangement of the same library system.

FIGS. 1 through 3 show the overall arrangement of a magnetic tape cartridge library system 1 embodying the present invention. FIG. 1 schematically illustrates the physical or mechanical arrangement of the library system 1, whereas each of FIGS. 2 and 3 is a circuit block diagram of the library system. The block diagram of FIG. 2 represents a maintenance wiring arrangement of the library system used for maintenance purposes, whereas the block diagram of FIG. 3 represents a control wiring arrangement used for controlling the library system. However, it should be noted that the library system 1 actually includes both kinds of wiring arrangements together, and the two kinds of wiring arrangements are separately shown in FIGS. 2 and 3, respectively, only for purposes of simplifying the illustration.

As shown in FIG. 1, the library system 1 comprises two shelf-type stockers 13 (only one shown in FIG. 1) each having a plurality of divided compartments for exchangeably accommodating magnetic tape cartridges 14. Each of the stockers 13 is disposed on a respective side of a common transfer track 12 used for movement of two accessors (ACC) 5R, 5L. The transfer track 12 may include a pair of rails. Each of the ACCs 5R, 5L makes access to each of the stocker compartments for transferring a selected tape cartridge from one position to another within the library system 1 while running on the track 12.

In addition to the stockers 13, the ACCs 5R, 5L and the transfer track 12, the library system 1 further comprises two accessor directors (ADR) 2R, 2L (see FIGS. 2 and 3), two accessor mechanism controllers (AMC) 3R, 3L, two control servos (CSV) 4R, 4L, a cartridge access station (CAS) 6, a direct entry-exit (DEE) 7, a tapedrive mount unit (TMU) 8, and two maintenance interface networks (MIN) 9R, 9L. The TMU 8 includes a plurality of drive monitors (DM) 10 (four such monitors in the illustrated embodiment) and a plurality of magnetic tapedrive units (MTU) 11 (sixteen such units in the illustrated embodiment). The ADRs 2L, 2R are connected to a host computer 22 (see FIG. 3). Though not shown, each of the ADRs 2R, 2L, the AMCs 3R, 3L, the CSVs 4R, 4L, the CAS 6, the DEE 7, the DMs 10 and the MTUs 11 has a MPU of its own.

As shown in FIG. 2, the right MIN 9R is connected to the ADR 2R, the AMC 3R and the CSV 4R via RS-232C cables. Similarly, the left MIN 9L is connected to the ADR 2L, the AMC 3L and the CSV 4L via RS-232C cables. In the illustrated embodiment, the MIN 9R is also connected in daisy chain to the CAS 6, the DEE 7 and the DM 10 via RS-232C cables. Further, a personal computer 22 connected to a telephone line 23 (as an example of communication line) is selectively connectable to either one of the two MINs 9R, 9L. The personal computer 22 is normally connected to the right MIN 9R for maintenance purposes but may be shifted to the left MIN 9L upon failure of the right MIN 9R for continuing the maintenance.

The ADRs 2R, 2L control the AMCs 3R, 3L and the DM 10 under the instructions of the host computer 21 (FIG. 3). The AMCs 3R, 3L control the CSVs 4R, 4L, the CAS 6 and the DEE 7 under the instructions of the ADRs 2R, 2L. The CSVs 4R, 4L control the drive motors (not shown) of the respective ACCs 5R, 5L under the instructions of the AMCs 3R, 3L. Thus, the ADRs 2R, 2L, the AMCs 3R, 3L, the CSVs 4R, 4L and the ACCs 5R, 5L are connected in hierarchy for controlling purposes.

As shown in FIG. 1, each of the CAS 6, the DEE 7 and the TMU 8 may be respectively installed in a suitable stocker portion not used for cartridge storage. The CAS 6 (cartridge access station) is a unit which is used by the outside operator (not shown) for loading an individual tape cartridge into the library system 1 and for unloading an individual tape cartridge from the library system, whereas the DEE 7 (direct entry-exit) is a unit which is used by the outside operator for loading and unloading a batch of tape cartridges (e.g. ten cartridges) housed in a case.

The TMU 8 (tapedrive mount unit) is a unit for mounting the plurality of DMs 10 (drive monitors) and the plurality of MTUs 11 (magnetic tapedrive units). The DMs 10 monitor the operational states of the MTUs 11, whereas each of the MTUs 11 drives a tape cartridge for recording and playback.

Normally, the right ADR 2R controls the TMU 9 and both of the AMCs 3R, 3L (used also for controlling the CAS 6 and the DEE 7), as shown in FIG. 3. However, when the right ADR 2R fails, the left ADR 2L takes the place of the right ADR 2R for controlling the TMU 9 and both of the AMCs 3R, 3L.

Figure 9:
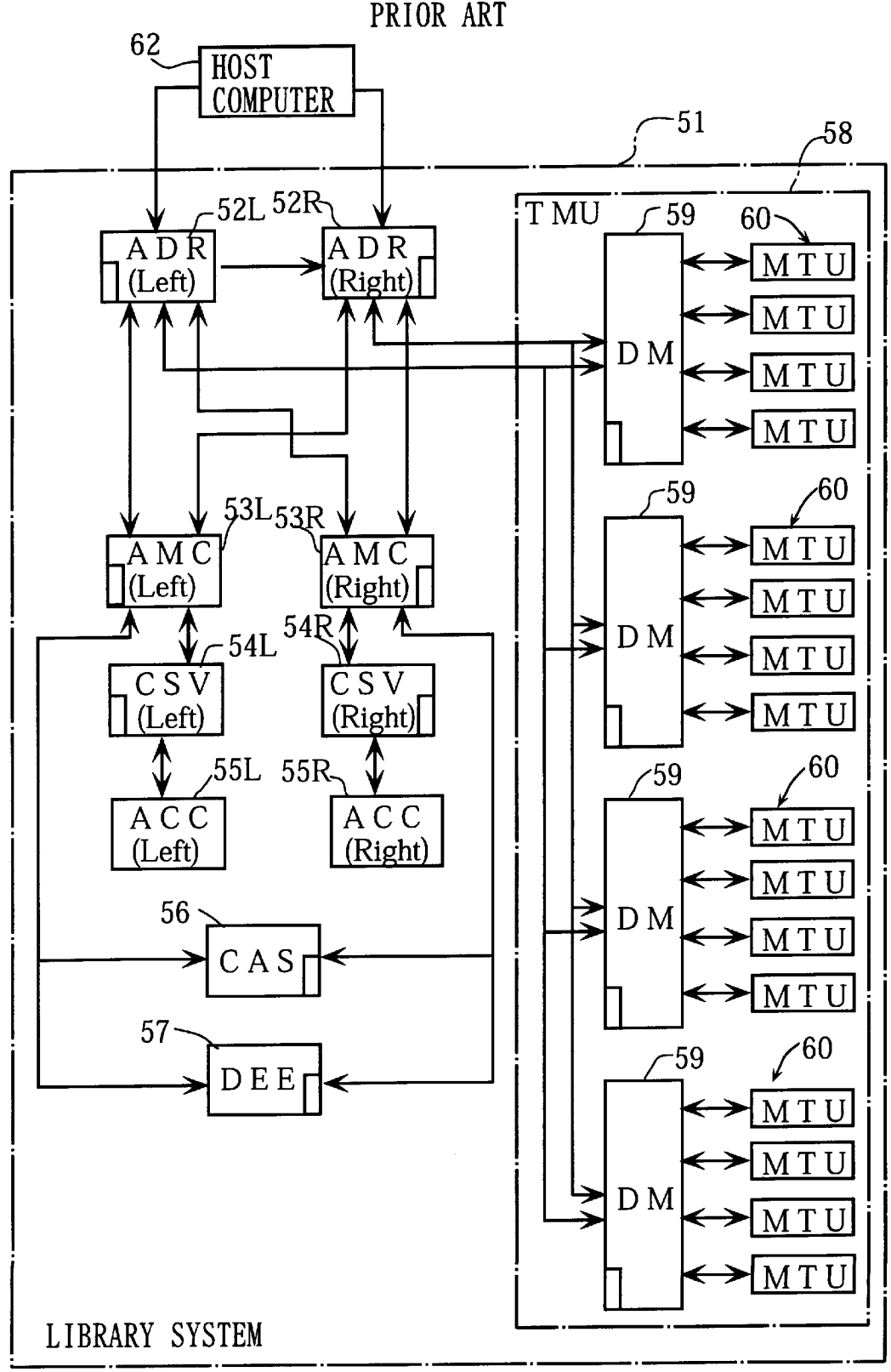
FIG. 9 is a circuit block diagram showing a control wiring arrangement of the prior art library system.

In this way, the control wiring arrangement (see FIG. 3) of the library system 1 is identical to that (see FIG. 9) of the prior art library system 51. The difference between the library system 1 of the present invention and the prior art library system 51 resides in the provision of the MINs 9R, 9L and their associated maintenance wiring arrangement (FIG. 2).

The right MIN 9R extracts history data from the ADRs 2R, 2L, the AMCs 3R, 3L, the CSVs 4R, 4L, the CAS 6, the DEE 7 and the DMs 10 upon receiving an error notifying command from either one of the ADRs 2R, 2L or a history extract command from the personal computer 22. At the failure of the right MIN 9R, alternatively, the left MIN 9L extracts history data from the ADRs 2R, 2L, the AMCs 3R, 3L, the CSVs 4R, 4L, the CAS 6, the DEE 7 and the DMs 10 upon receiving an error notifying command from either one of the ADRs 2R, 2L or a history extract command from the personal computer 22. In the latter case, therefore, the cables from the personal computer 22 and from the CAS 6 are connected to the left MIN 9L.

The personal computer 22 transmits various commands to the MIN 9R (or 9L) under the instructions entered via the telephone line 23 and sends the history data from the MIN 9R to a remote location via the telephone line 23. Further, the personal computer 22 periodically transmits a history extract command to the MIN 9R according to a pre-installed program to extract the history data from the MIN 9R for transmission to a remote location via the telephone line 23.

Figure 4:
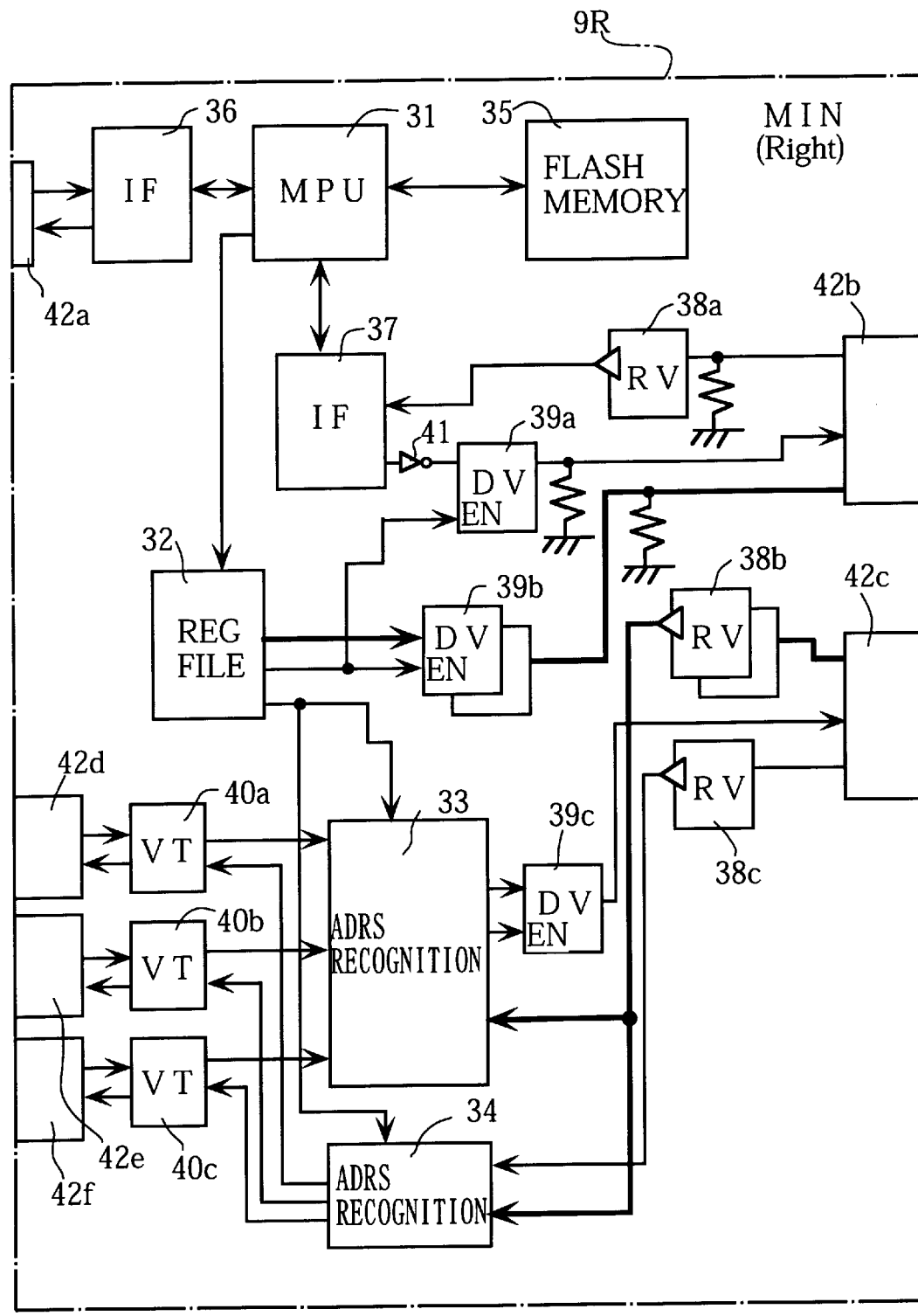
FIG. 4 is a circuit block diagram showing a maintenance interface network incorporated in the same library system.

FIG. 4 is a circuit block diagram of the right MIN 9R. As shown in this figure, the MIN 9R includes, a micro processing unit (MPU) 31, a register file 32, an output-side address recognition circuit 33, an input-side address recognition circuit 34, a flash memory 35, interface circuits 36, 37, receiver circuits 38a~38c, driver circuits 39a~39c, voltage transforming circuits 40a~40c, an inverter 41 and connectors 42a~42f. The left MIN 9L also has the same circuit arrangement.

The MPU 31 provides an overall control of the MIN 9R.

The register file 32 is used for writing and reading out various data under the control of the MPU 31.

The output-side address recognition circuit 33 recognizes the input address entered via the receiver circuit 38b for connecting a selected one of the voltage transforming circuits 40a~40c to the driver circuit 39c according to the address recognition while controlling the driver circuit 39c. Similarly, the input-side address recognition circuit 34 recognizes the input address entered via the receiver circuit 38b for supplying the instruction signal from the receiver circuit 38c to a selected one of the voltage transforming circuits 40a~40c according to the address recognition. As more clearly described hereinafter, each of the address recognition circuits 33, 34 may be switched between two different operation modes according to an active setting signal from the register file 32.

The flash memory 35 stores the history data which have been input to the MPU 31 through the interface circuit 37.

Each of the interface circuits 36, 37 controls input and output to and from the MPU 31.

Each of the receiver circuits 38a~38c adjusts the received signals. The receiver circuit 38a is connected to the interface 37 and the connector 42b, whereas the receiver circuit 38b is connected to the respective address recognition circuits 33, 34 and the connector 42c. The receiver circuit 38c is connected to the input-side address recognition circuit 34 and the connector 42c.

Each of the driver circuits 39a~39c adjusts the transmitting signals. The driver circuit 39a is connected to the register file 32, the interface circuit 37 and the connector 42b, whereas the driver circuit 39b is connected to the register file 32 and the connector 42b. The driver circuit 39c is connected to the output-side address recognition circuit 33 and the connector 42c.

Each of the voltage transforming circuits 40a~40c provides voltage conversion (e.g. from 5 V to 24 V or vice versa) of the signals exchanged between the address recognition circuits 33, 34 and the connectors 42d~42f.

The inverter 41 inverts the signals from the interface circuit 37 for output to the driver circuit 39a.

Figure 5:
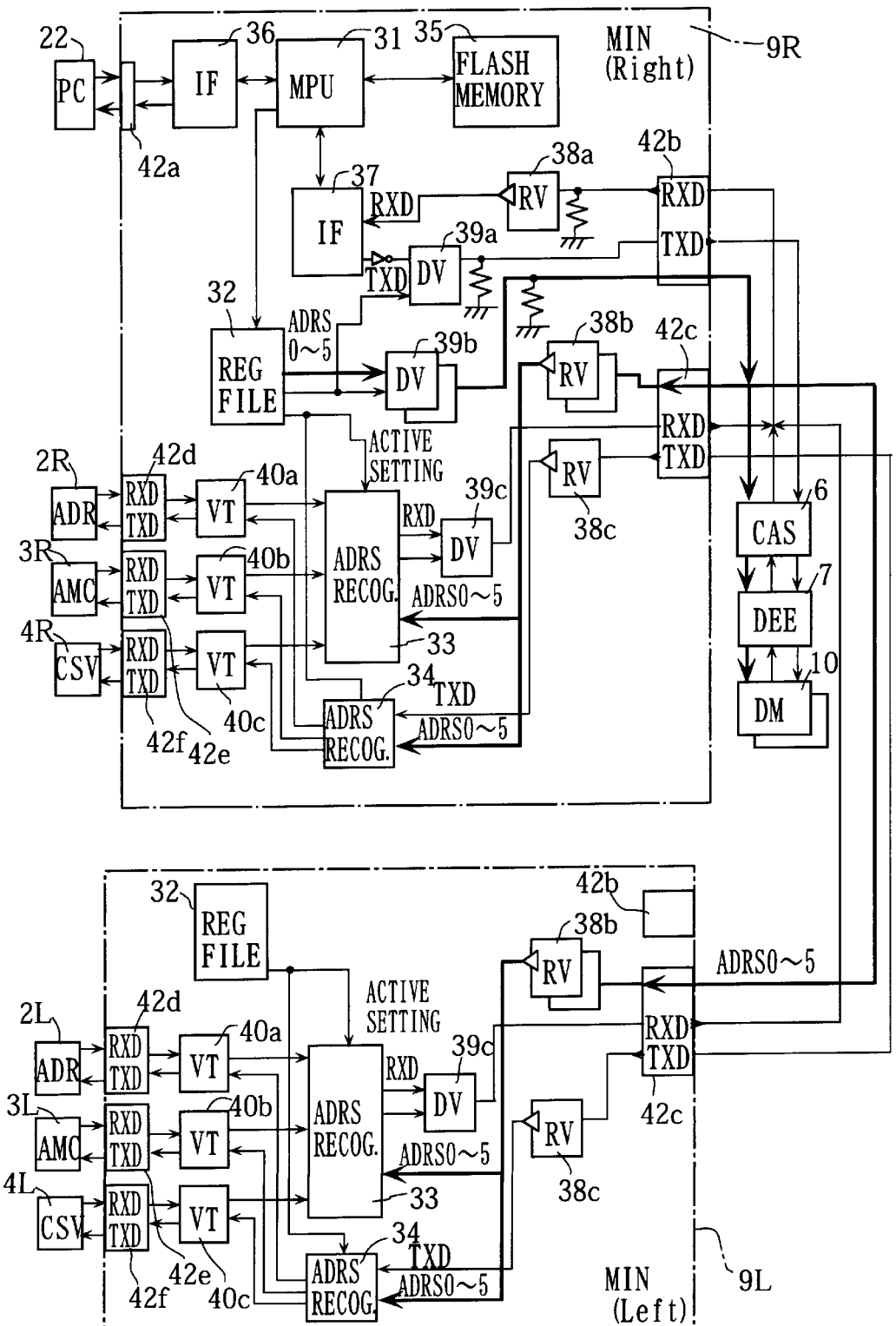
FIG. 5 is a circuit block diagram showing the maintenance interface network connected to the various elements of the library system.

Each of the connectors 42a~42f is a RS-232C connector according to the illustrated embodiment. As shown in FIG. 5, the connector 42a of the right MIN 9R is normally connected to the personal computer 22. The connector 42b of the right MIN 9R is connected to the CAS 6, the DEE 7 and the DM 10 in a daisy chain, as previously described. The connector 42c of the right MIN 9R is connected to the connector 42b of the same MIN 9R and the connector 42c of the left MIN 9L. The connectors 42d~42f of the right MIN 9R are connected respectively to the right ADR 2R, the right AMC 3R and the right CSV 4R. Further, the connectors 42d~42f of the left MIN 9L are connected respectively to the left ADR 2L, the left AMC 3L and the left CSV 4L.

In FIG. 5, the thick solid lines represent 6-bit address lines. Further, in FIG. 5, several components (such as the MPU 31, the flash memory 35, the interfaces 36, 37, the connector 42 and etc.) of the left MIN 9L are omitted for the convenience of illustration because the omitted components are non-operative when the personal computer 22 is connected to the right MIN 9R.

According to the illustrated embodiment, each of the CAS 6 and the DEE 7 serves as a loading-unloading unit for loading and unloading magnetic tape cartridges 14 or information recording media into and out of the library system 1. The TMU 8 works as a recording-playback unit for recording information on each recording medium and for playing back the recorded information. Each of the ACCs 5R, 5L functions as a transfer unit for transferring each tape cartridge within the library system 1, including the transfer of the tape cartridge from a stocker compartment to each of the CAS 6, the DEE 7 and the TMU 8 or vice versa. The host computer 21 works as a controller, whereas the ADRs 2R, 2L, the AMCs 3R, 3L and the CSVs 4R, 4L serve as intermediate control units for controlling the operation of the ACCs 5R, 5L, the CAS 6, the DEE 7 and the TMU 8 under the control of the host computer 21 (controller). Each of the MINs 9R, 9L serves as a history collecting unit for collecting the history data from the ACCs 5R, 5L, the CAS 6, the DEE 7 and the TMU 8 through the intermediary of the ADRs 2R, 2L, the AMCs 3R, 3L, the CSVs 4R, 4L and the DMs 10.

It should be noted that each of the CAS 6, the DEE 7 and the DMs 10 incorporates an address recognition circuit of its own for recognition of the input address entered from the register file 32 through the driver circuit 39b and the connector 42b.

Next, the operation of the MINs 9R, 9L is described below with particular reference to the flow diagram of FIG. 6.

First, the MPU 31 of the right MIN 9R determines whether the right MIN 9R is connected to the personal computer 22 (Step S1). Specifically, the MPU 31 checks whether an active setting command is entered from the personal computer 22. This step is necessary because the personal computer 22 is connected to the left MIN 9L at the failure of the left MIN 9R.

If an active setting command is entered from the personal computer (YES in Step S1), the MPU 31 of the right MIN 9R performs active setting (Step S2). More specifically, the MPU 31 of the right MIN 9R writes active setting data in a predetermined register of the relevant register file 32. As a result, the active setting signal from the relevant register file 32 becomes high, thereby making each of the relevant address recognition circuits 33, 34 responsive to the addresses [01], [02] and [03] (as represented in hexadecimal notation), respectively. Conversely, if No in Step S1, the active setting signal from the relevant register file becomes low to make the relevant address recognition circuits 33, 34 responsive to the addresses [09], [0A] and [0B], respectively.

On the other hand, the active setting signal from the register file 32 of the left MIN 9L is low if YES in Step S1. In this condition, the address recognition circuits 33, 34 of the left MIN 9L are rendered responsive to the addresses [09], [0A] and [0B], respectively. Conversely, if the active setting signal from the register file 32 of the left MIN 9L becomes high (NO in Step S1), the address recognition circuits 33, 34 of the left MIN 9L are rendered responsive to the addresses [01], [02] and [03], respectively.

FIG. 7 is a table showing the relationship between the various addresses and the different elements of the library system. As shown in this table, the addresses [01], [02] and [03] are assigned to the right ADR 2R, the right AMC 3R and the right CSV 4R, respectively, whereas the addresses [09], [0A] and [0B] are allocated to the left ADR 2L, the left AMC 3L and the left CSV 4L, respectively. Under this condition, when the address [01] is input to the address recognition circuits 33, 34 of the right MIN 9R under the high-level active setting (YES in Step S1), each of the address recognition circuits 33, 34 validates signal transmission only with respect to the voltage transforming circuit 40a while invalidating signal transmission with respect to the other voltage transforming circuits 40b, 40c. Similarly, when the address [02] is input to the address recognition circuits 33, 34 of the right MIN 9R, each of the address recognition circuits 33, 34 validates signal transmission only with respect to the voltage transforming circuit 40b while invalidating signal transmission with respect to the other voltage transforming circuits 40a, 40c. Alternatively, when the address [03] is input to the address recognition circuits 33, 34 of the right MIN 9R, each of the address recognition circuits 33, 34 validates signal transmission only with respect to the voltage transforming circuit 40c while invalidating signal transmission with respect to the other voltage transforming circuits 40a, 40b. If any other address is input to the address recognition circuits 33, 34 of the right MIN 9R, each of the address recognition circuits 33, 34 invalidates signal transmission with respect to all of the voltage transforming circuits 40a~40c. In this regard, it should be noted that each of the address recognition circuits 33, 34 is designed to provide a low-level output when the input address coincides with one of the pre-assigned addresses while providing a high-level output when the input addresses does not correspond to any one of the pre-assigned addresses.

On the other hand, when the address [09] is input to the address recognition circuits 33, 34 of the left MIN 9L under the low-level active setting, each of the address recognition circuits 33, 34 validates signal transmission only with respect to the voltage transforming circuit 40a while invalidating signal transmission with respect to the other voltage transforming circuits 40b, 40c. Similarly, when the address [0A] is input to the address recognition circuits 33, 34 of the left MIN 9L, each of the address recognition circuits 33, 34 validates signal transmission only with respect to the voltage transforming circuit 40b while invalidating signal transmission with respect to the other voltage transforming circuits 40a, 40c. Alternatively, when the address [0B] is input to the address recognition circuits 33, 34 of the left MIN 9L, each of the address recognition circuits 33, 34 validates signal transmission only with respect to the voltage transforming circuit 40c while invalidating signal transmission with respect to the other voltage transforming circuits 40a, 40b. If any other address is input to the address recognition circuits 33, 34 of the left MIN 9L, each of the address recognition circuits 33, 34 invalidates signal transmission with respect to all of the voltage transforming circuits 40a~40c.

If the personal computer 22 is connected to the left MIN 9L due to a failure of the right MIN 9R, the MPU 31 of the left MIN 9L causes the relevant register file 32 to supply a high-level active setting signal to the relevant address recognition circuits 33, 34, whereas the MPU 31 of the right MIN 9R causes the relevant register file 32 to send a low-level active setting signal to the relevant address recognition circuits 33, 34. As a result, each of the address recognition circuits 33, 34 of the left MIN 9L now recognizes the addresses [01], [02] and [03], whereas each of the address recognition circuits 33, 34 of the right MIN 9R recognizes the addresses [09], [0A] and [0B]. Therefore, the personal computer 22 treats the left ADR 2L, the left AMC 3L and the left CSV 4L as corresponding to the addresses [01], [02] and [03], respectively, while regarding the right ADR 2R, the right AMC 3R and the right CSV 4R as corresponding to the addresses [09], [0A] and [0B], respectively. Due to such a shift between the two different active settings, the right MIN 9R and the left MIN 9L may be designed to have exactly the same circuit arrangement, thereby realizing a production cost decrease.

Figure 6:
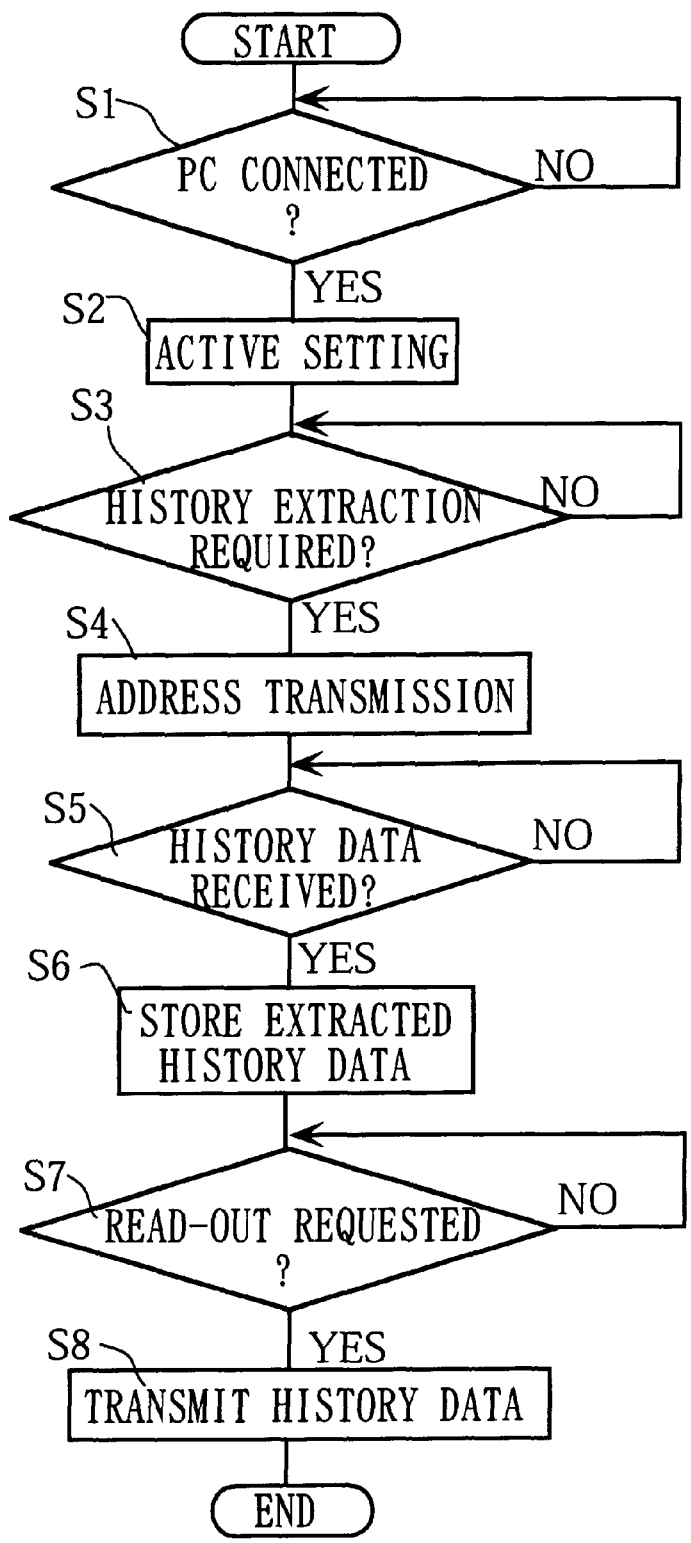
FIG. 6 is a flow diagram illustrating the operation of the maintenance interface network.
Figure 8:
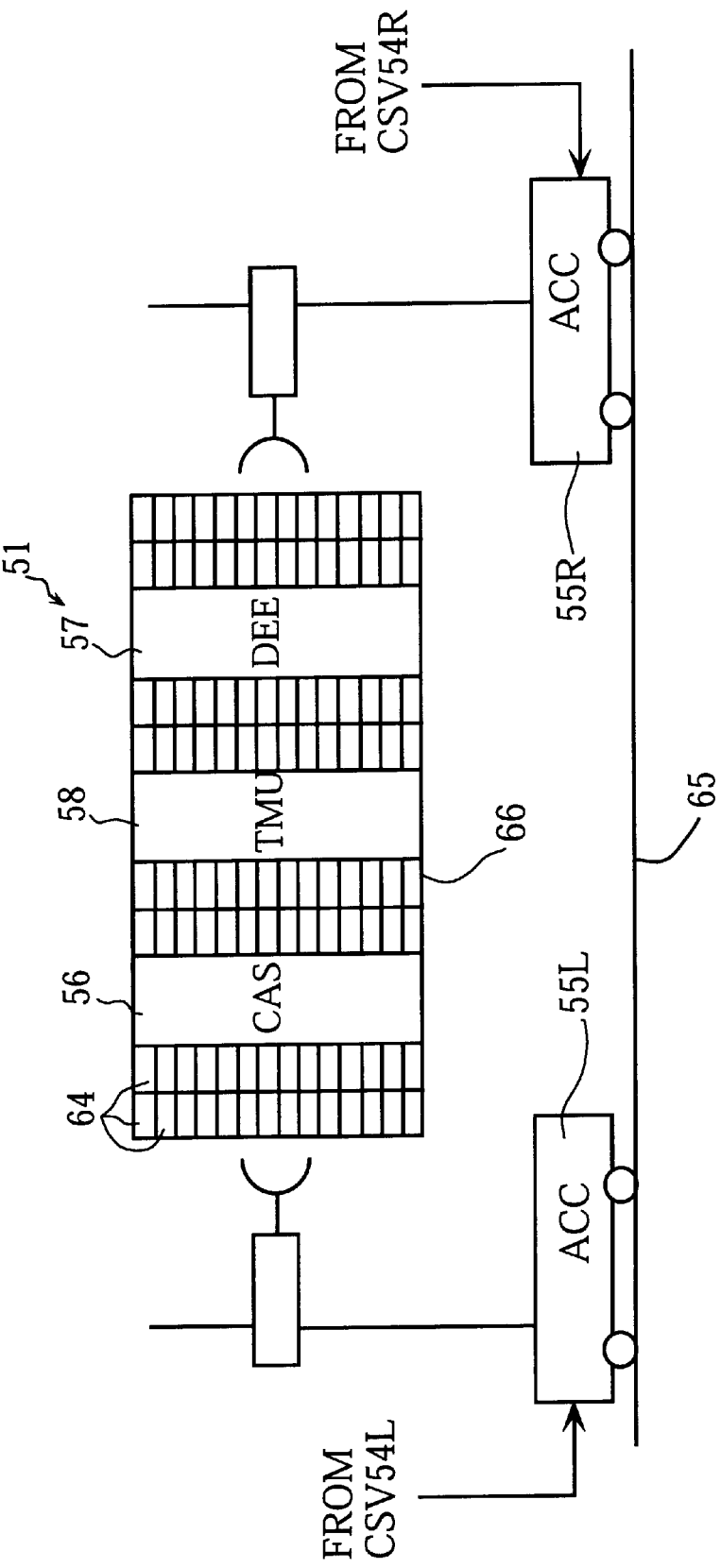
FIG. 8 is a schematic view showing the overall arrangement of a prior art library system.

Returning to the flow diagram of FIG. 6, Step S2 (active setting step) is followed by Step S3 wherein the MPU 31 of the right MIN 9R connected to the personal computer 22 determines whether history extraction is required. Specifically, the MPU 31 checks whether a history extraction command is entered from the personal computer 22 or whether an error notice is entered from either one of the ADRs 2R, 2L. For extracting the history data by remote control, a request for history extraction is made via the telephone line 23 whereby the personal computer 22 transmits a history extraction command to the right MIN 9R. For periodically extracting the history data, the personal computer 22 may be programmed to send a history extraction command to the right MIN 9R at a predetermined time interval. At the time of an operation error, either one of the ADRs 2R, 2L at the highest position of the control hierarchy (see FIG. 3) sends an error code to the right MIN 9R.

If YES in Step S3, the MPU 31 of the right MIN 9R transmits the address of a target element from which the history data should be extracted, together with a history extraction command (Step S4). More specifically, the MPU 31 of the right MIN 9R writes the address of a target element in a predetermined register of the register file 32 and transmits a history extraction command to the interface circuit 37. As a result, the history extraction command and the entered address are transmitted through the driver circuits 39a, 39b and the connector 42b of the right MIN 9R for input to the respective connectors 42c of both MINs 9R, 9L as well as the CAS 6, the DEE 7 and the DMs 10.

It is now assumed that the address [0B] is transmitted from the connector 42b of the right MIN 9R together with the history extraction command. This address is entered in the respective address recognition circuits 33, 34 of the left MIN 9L through the connector 42c and the receiver-circuit 38b of the same MIN, whereas the history extraction command is input to the input-side address recognition circuit 34 of the same MIN 9L through the connector 42c and the receiver circuit 38c. As a result, the address recognition circuits of the left MIN 9L validate signal transmission only with respect to the voltage transforming circuit 40c of the same MIN, whereby the history extraction command is transmitted only to the left CSV 4L from which the relevant history data are extracted.

On the other hand, the address [0B] and the history extraction command are also input to the address recognition circuits 33, 34 of the right MIN 9R. However, since the address recognition circuits 33, 34 of the right MIN 9R are set to respond only to the addresses [01], [02] and [03] when the right MIN 9R is connected to the personal computer 22, the history extraction command. is transmitted to none of the right ADR 2R, the right AMC 3R and the right CSV 4R. Similarly, since each of the CAS 6, the DEE 7 and the DMs 10 has an address recognition circuit of its own, the history extraction command entered together with the address [0B] is ineffective.

Next, in Step S5, the MPU 31 of the right MIN 9R determines whether it has received the extracted history data. Under the previous assumption, the history data from the left CSV 4L are transmitted to the connector 42b of the right MIN 9R through the connector 42f, the voltage transforming circuit 40c, the output-side address recognition circuit 33, the driver circuit 39c and the connector 42c of the left MIN 9L, and then to the MPU 31 of the right MIN 9R through the receiver circuit 38a and the interface 37 of the right MIN 9R. The MPU 31 of the right MIN 9R checks the reception of the extracted history data.

If YES in Step S5, the MPU 31 of the right MIN 9R stores the extracted history data in the flash memory 35 (Step S6).

Then, the MPU 31 of the right MIN 9R determines whether the history data stored in the memory 35 should be read out (Step S7). More specifically, the MPU 31 of the right MIN 9R checks whether a history read-out command is entered from the personal computer 22. For requesting the history data by remote control, such a read-out command is supplied to the personal computer 22 through the telephone line 23 for input to the MPU 31 of the right MIN 9R.

If YES in Step S7, the MPU 31 of the right MIN 9R reads out the history data from the flash memory 35 for output to the personal computer 22 through the interface 36 (Step S8). The personal computer 22 then transmits the received history data through the telephone line 23.

If NO in Step S7, the MPU 31 of the right MIN 9R waits for a history read-out command (i.e., repetition of Step S7).

If NO in Step S5, the MPU 31 of the right MIN 9R waits for the history data extracted from the left CSV 4L (i.e., repetition of Step S5).

If NO in Step S5, the MPU 31 of the right MIN 9R waits for the control.

If NO in Step S3, the MPU 31 of the right MIN 9R waits for a history extraction command from the personal computer (i.e., repetition of Step S3).

If NO in Step S1, the MPU 31 of the right MIN 9R waits for an active setting command from the personal computer (namely, repetition of Step S1).

After storing the history data of the left CSV 4L in the flash memory 35 in Step S7 or transmitting the same through the telephone line in Step S8, the sequence of Steps S1~S7 or S1~S8 may be repeated for extracting the history data of the other element or elements.

As described, the personal computer 22 needs to be connected to one of the two MINs 9R, 9L (normally the right MIN 9R), and such a connection enables the personal computer 22 to extract the history data from any one of the ADRs 2R, 2L, the AMCs 3R, 3L, the CSVs 4R, 4L, the CAS 6, the DEE 7 and the DMs 10 by transmitting the relevant one of the addresses allocated to these elements. Thus, due to the provision of the MINs 9R, 9L, the following advantages may be expected.

(1) It is unnecessary for the operator to make access to each one of the ADRs 2R, 2L, the AMCs 3R, 3L, the CSVs 4R, 4L, the CAS 6, the DEE 7 and the DMs 10 for selective connection of the personal computer 22 to a failed one of these elements. Thus, the history extraction from every one of these elements may be performed very conveniently and quickly.

(2) The single personal computer 22 may be utilized as a debugger for every one of the ADRs 2R, 2L, the AMCs 3R, 3L, the CSVs 4R, 4L, the CAS 6, the DEE 7 and the DMs 10.

(3) Since the personal computer 22 is connected to the telephone line 23 for remote control, it is unnecessary for the operator to go to the location of the library system 1 for purposes of extracting the history data of each failed element.

(4) Since the personal computer 22 is programmed to transmit a history extraction command in response to an error notice from the ADRs 2R, 2L (arranged at the highest position of the control hierarchy), it is possible to extract the history data from any erroneous one of the ADRs 2R, 2L, the AMCs 3R, 3L, the CSVs 4R, 4L, the CAS 6, the DEE 7 and the DMs 10 immediately upon occurrence of an error. Thus, it is possible to prevent the history data of each of these elements from being unexpectedly renewed before checking.

(5) Since the flash memory 35 of the MIN 9R (or MIN 9L) stores the extracted history data, each of the ADRs 2R, 2L, the AMCs 3R, 3L, the CSVs 4R, 4L, the CAS 6, the DEE 7 and the DMs 10 does not need to have a special memory region dedicated for storing its own history. Further, since the memory 35 is non-volatile, the history data stored in this memory will not be unexpectedly lost even at the time of a power failure.

(6) Since the MIN 9R, the CAS 6, the DEE 7 and the DMs 10 are connected in a daisy chain, the total length of the cables connecting these elements will be much shorter than if the MIN 9R is connected directly to each of the CAS 6, the DEE 7 and the DMs 1.

(7) Since each of the MINs 9R, 9L is selectively connectable to the personal computer 22, it is still possible to extract the history data even if one of the MINs 9R, 9L or one of the intermediate control units 2R, 2L, 3R, 3L, 4R, 4L associated therewith fails.

According to the preferred embodiment described above, communications to and from each of the MINs 9R, 9L are made through RS-232C cables. However, such communications may be made through other types of cables such as Centronics cables.

Further, instead of providing the address recognition circuits 33, 34 in each of the MINs 9R, 9L, each of the ADRs 2R, 2L, the AMCs 3R, 3L and the CSVs 4R, 4L may incorporate an address recognition circuit of its own for distinguishing the different addresses corresponding to these elements.

Further, in the illustrated embodiment, the connector 42b of the left MIN 9L is not connected to the CAS 6 when the personal computer 22 is connected to the right MIN 9R, so that the CAS 6 needs to be connected to the connector 42b of the left MIN 9L when the personal computer 22 is connected to the left MIN 9L at the time of a failure of the right MIN 9R. However, the CAS 6 may be connected to the connectors 42b of both MINs 9R, 9L simultaneously for obviating the need for selectively connecting the CAS 6 to one of the connectors 42b of the MINs 9R, 9L.

The preferred embodiment of the present invention being thus described, it is obvious that the same may be varied in various ways. Such variations should not be regarded as a departure from the spirit and scope of the invention, and al. such variations as would be obvious to those skilled in the art are intended to be included within the scope of the appended claims.

What is claimed is:

1. A library system for information recording media comprising:

a loading-unloading unit for loading the recording media into the library system and for unloading the recording media out of the library system;

a stocker for storing the recording media;

a recording-playback unit for recording information on each of the recording media and for playing back each of the recording media;

a transfer unit for transferring each of the recording media within the library system;

a controller for controlling the loading-unloading unit, the recording-playback unit and the transfer unit;

a group of control lines for connecting the controller to the loading-unloading unit, the recording-playback unit and the transfer unit;

a group of maintenance lines provided separately from the group of control lines for extracting history data from the loading-unloading unit, the recording-playback unit and the transfer unit, respectively; and a maintenance interface network connected to the group of maintenance lines for output of the extracted history data.

2. The library system according to claim 1, wherein the loading-unloading unit and the recording-playback unit are connected to the maintenance interface network in a daisy chain, each of the loading-unloading unit and the recording-playback unit being allocated a different address of its own, each of the loading-unloading unit and the recording-playback unit transmitting its history data to the maintenance interface network only upon input of its allocated address.

3. The library system according to claim 1, further comprising a plurality of intermediate control units connected in hierarchy to the controller for controlling the loading-unloading unit, the recording-playback unit and the transfer unit under the control of the controller, wherein each of the intermediate control units is also connected to the maintenance interface network and allocated a different address of its own, each of the intermediate control units transmitting its history data to the maintenance interface network only upon input of its allocated address.

4. The library system according to claim 3, wherein the maintenance interface network comprises an address recognition unit for recognizing an input address corresponding to each of the intermediate control units and for validating history extraction only from one of the intermediate control units corresponding to the input address.

5. The library system according to claim 1, wherein the maintenance interface network is connected to a computer for entering a history extraction command to the maintenance interface network and for obtaining the extracted history data from the maintenance interface network.

6. The library system according to claim 5, wherein the computer is connected to a communication line which is used for requesting history extraction by remote control.

7. The library system according to claim 5, wherein the computer is programmed to enter a history extraction command to the maintenance interface network periodically at a predetermined time interval.

8. The library system according to claim 5, wherein the computer is programmed to enter a history extraction command to the maintenance interface network upon reception of an error notice from the maintenance interface network.

9. The library system according to claim 1, wherein the maintenance interface network comprises a non-volatile erasable memory for storing the extracted history data.

10. A library system for information recording media comprising:

a loading-unloading unit for loading the recording media into the library system and for unloading the recording media out of the library system;

a stocker for storing the recording media;

a recording-playback unit for recording information on each of the recording media and for playing back each of the recording media;

a transfer unit for transferring each of the recording media within the library system;

a controller for controlling the loading-unloading unit, the recording-playback unit and the transfer unit; and a history collecting unit for extracting history data from the loading-unloading unit, the recording-playback unit and the transfer unit, said history collecting unit comprising a maintenance interface network.

11. The library system according to claim 10, wherein the loading-unloading unit and the recording-playback unit are connected to the history collecting unit in a daisy chain, each of the loading-unloading unit and the recording-playback unit being allocated a different address of its own, each of the loading-unloading unit and the recording playback unit transmitting its history data to the history collecting unit only upon input of its allocated address.

12. The library system according to claim 10, further comprising a plurality of intermediate control units connected in hierarchy to the controller for controlling the loading-unloading unit, the recording-playback unit and the transfer unit under the control of the controller, wherein each of the intermediate control units is also connected to the history collecting unit and allocated a different address of its own, each of the intermediate control units transmitting its history data to the history collecting unit only upon input of its allocated address.

13. The library system according to claim 12, wherein the history collecting unit comprises an address recognition unit for recognizing an input address corresponding to each of the intermediate control units and for validating history extraction only from one of the intermediate control units corresponding to the input address.

14. The library system according to claim 10, wherein the history collecting unit is connected to a computer for entering a history extraction command to the history collecting unit and for obtaining the extracted history data from the history collecting unit.

15. The library system according to claim 14, wherein the computer is connected to a communication line which is used for requesting history extraction by remote control.

16. The library system according to claim 14, wherein the computer is programmed to enter a history extraction command to the history collecting unit periodically at a predetermined time interval.

17. The library system according to claim 14, wherein the computer is programmed to enter a history extraction command to the history collecting unit upon reception of an error notice from the history collecting unit.

18. The library system according to claim 10, wherein the history collecting unit comprises a non-volatile erasable memory for storing the extracted history data.

19. The library system according to claim 10, wherein the history collecting unit comprises a plurality of maintenance interface networks, each of the maintenance interface networks extracts the history data from at least one of the loading-unloading unit, the recording-playback unit and the transfer unit.

20. The library system according to claim 19, wherein a selected one of the maintenance interface networks is connected to a computer for entering a history extraction command to the selected maintenance interface network and for obtaining the extracted history data from the selected maintenance interface network.

21. A library system for information recording media comprising:

a loading-unloading unit loading the recording media into the library system and unloading the recording media out of the library system;

a stocker storing the recording media;

a recording-playback unit recording information on each of the recording media and playing back each of the recording media;

a transfer unit transferring each of the recording media within the library system;

a controller controlling the loading-unloading unit, the recording-playback unit and the transfer unit; and a history collecting unit extracting history data from the loading-unloading unit, the recording-playback unit and the transfer unit, wherein the history collecting unit is connected to a computer to enter a history extraction command to the history collecting unit and to obtain the extracted history data from the history collecting unit, and the computer is programmed to enter a history extraction command to the history collecting unit periodically at a predetermined time interval.

22. A library system for information recording media comprising:

a loading-unloading unit loading the recording media into the library system and unloading the recording media out of the library system;

a stocker storing the recording media;

a recording-playback unit recording information on each of the recording media and playing back each of the recording media;

a transfer unit transferring each of the recording media within the library system;

a controller controlling the loading-unloading unit, the recording-playback unit and the transfer unit; and a history collecting unit extracting history data from the loading-unloading unit, the recording-playback unit and the transfer unit, wherein the history collecting unit is connected to a computer to enter a history extraction command to the history collecting unit and to obtain the extracted history data from the history collecting unit, and the computer is programmed to enter a history extraction command to the history collecting unit upon receipt of an error notice from the history collecting unit.

* * * * *